May 17, 1966  C. W. VASSAR  3,251,332
PIPE-FORMING APPARATUS USING A FLOATING SUPPORT
Filed Jan. 24, 1964  2 Sheets-Sheet 1

INVENTOR.
CLYDE W. VASSAR
BY
Lyon & Lyon
ATTORNEYS

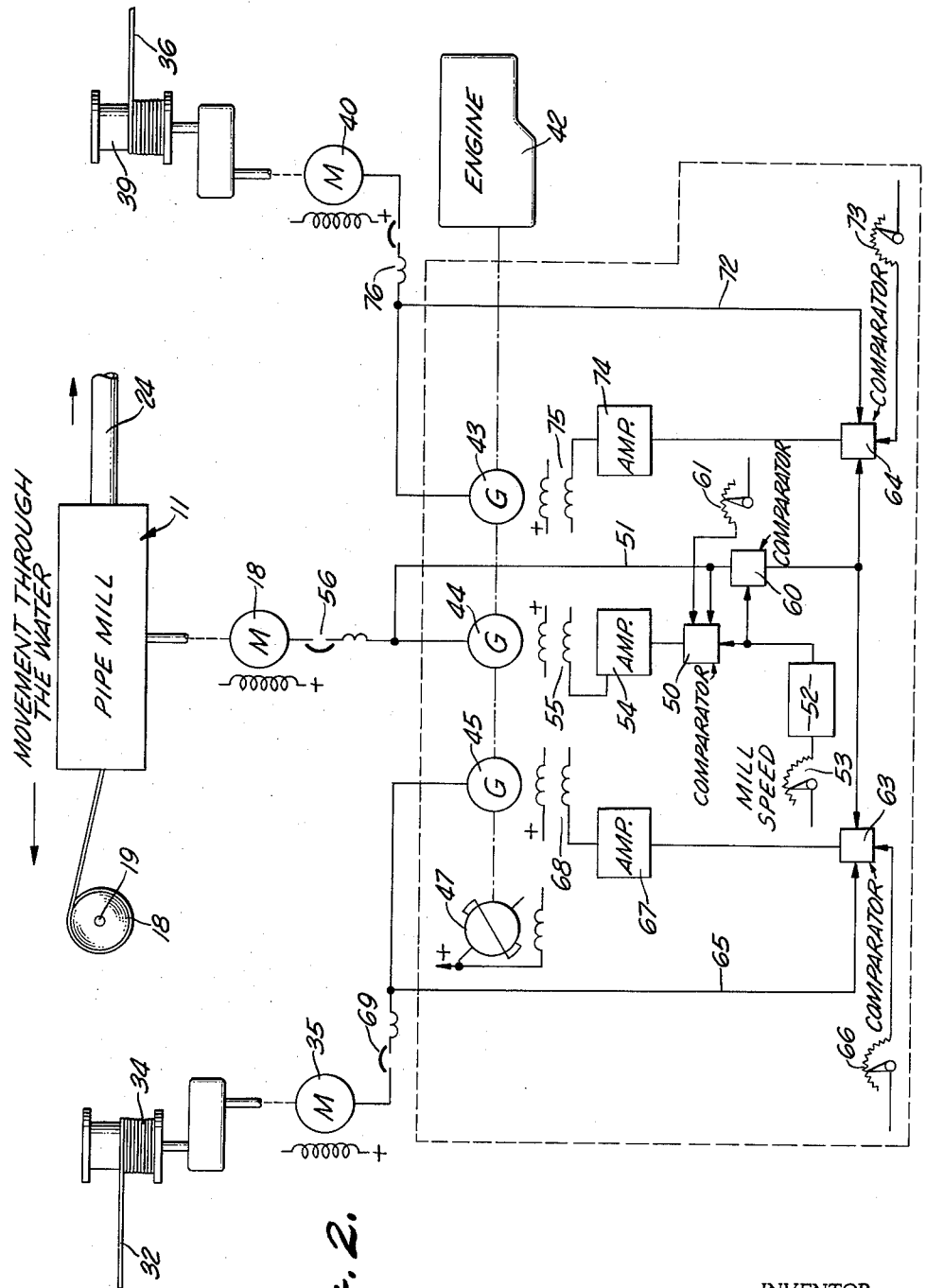

United States Patent Office 3,251,332
Patented May 17, 1966

3,251,332
PIPE-FORMING APPARATUS USING A
FLOATING SUPPORT
Clyde W. Vassar, Oswego, Oreg., assignor to Mobile Pipe Corporation, San Francisco, Calif., a corporation of California
Filed Jan. 24, 1964, Ser. No. 340,082
2 Claims. (Cl. 114—235)

This invention relates to manufacture of pipe on a floating barge.

It is a general object of this invention to provide a method and apparatus for continuously making welded steel pipe from a roll of skelp on a floating support, such as a barge, so that the pipe as it is continuously formed and welded moves over the end of the barge and into the water.

Another object is to provide apparatus for making continuous pipe on a floating support wherein a motor is provided to drive the transition rolls and forming rolls for shaping a metal strip into a cylindrical member, and wherein means including another motor is employed for moving the floating support through the water, together with means for varying the relative speed of the motors.

Another object is to provide a method of making continuous pipe and lowering it into a body of water, which method includes forming and welding the pipe on a floating support while towing the support by means of one tugboat and while impeding the motion of the towed support through the water by means of another tugboat.

Other and more detailed objects and advantages will appear hereinafter.

In the drawings:

FIGURE 2 is a schematic diagram showing apparatus for controlling the operation of the motors which drive the pipe mill and which operate the cable winches.

Figure 1:
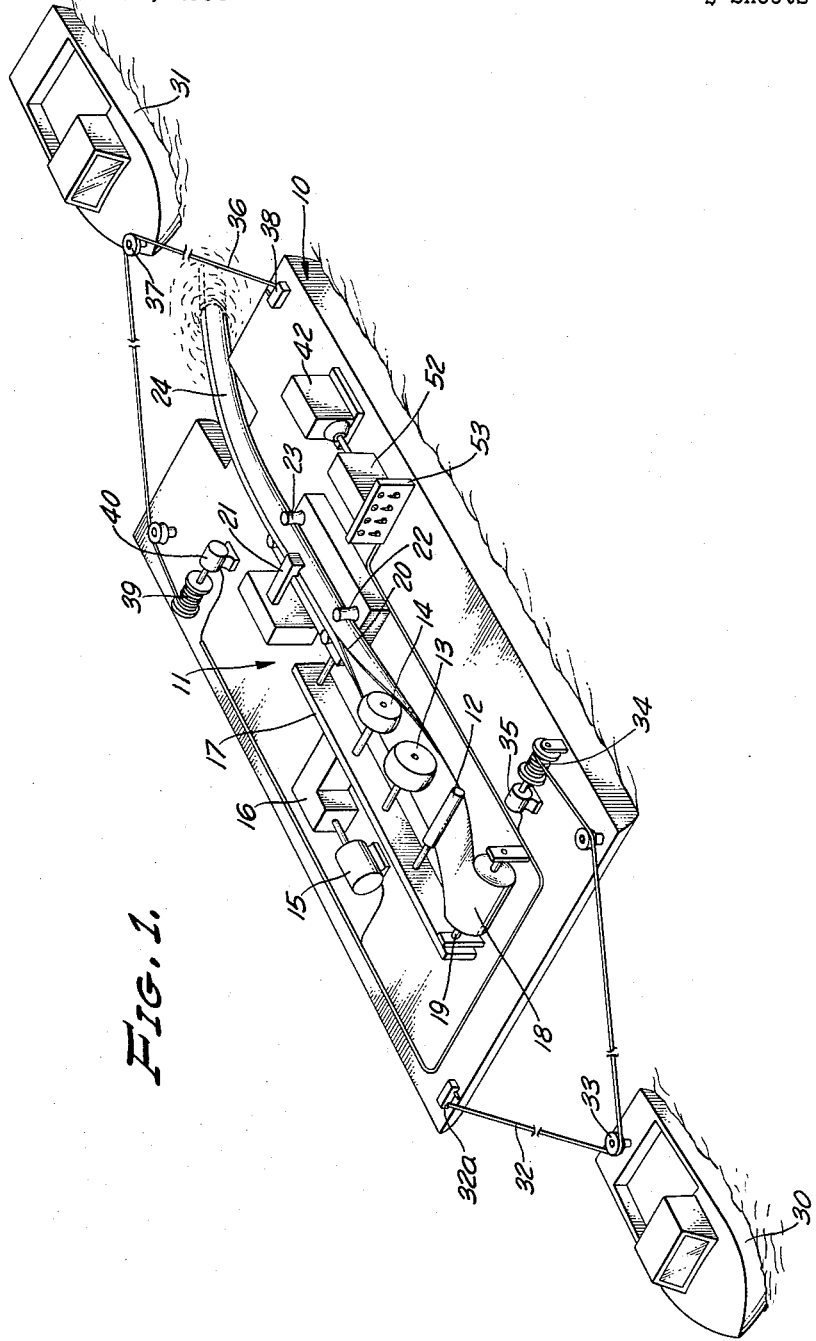
FIGURE 1 is a perspective view and shows a preferred form of apparatus embodying this invention, and utilized in carrying out the method of this invention.

Referring to the drawings, the floating support or barge 10 carries a pipe mill, generally designated 11. This pipe mill includes a plurality of transition rolls 12, 13, and 14 which are driven from a motor 15 by way of power-transmission connections 16 and 17. A coil of skelp 18 is supported on the supply shaft 19, and the flat strip extending from the coil of skelp passes in contact with the power driven forming rolls 12, 13, and 14. Additional forming rolls, not shown, co-operate with the transition rolls 12, 13, and 14 to bring the side edges of the skelp together to form a cylinder. The joint 20 is continuously welded by the welding device 21 as the pipe passes through the sizing rolls 22 and 23. The welded pipe 24 then passes rearward from the barge 10 and into the water.

Means are provided for moving the barge 10 forward in the water at a speed equal to the rate of movement of the pipe 24 relative to the barge 10. As shown in the drawings, this means includes a first tugboat 30 forward of the barge 10 and a second tugboat 31 rearward of the barge 10. A first cable 32 passes around a pulley 33 on the first tugboat 30 and is fixed at one end 34 to the barge 10. The other end of the cable 32 is spooled on the drum of the winch 34, driven by the motor 35. In similar fashion, a second cable 36 passes around a pulley 37 on the second tugboat 31 and is fixed at one end 38 to the barge 10. The other end of the cable 36 is spooled on the drum of the winch 39, driven by the motor 40.

An electrical system for controlling the speed of the mill driving motor 18 and the winch drive motors 35 and 40 is shown diagrammatically in FIGURE 2. A prime mover 42 such as a diesel engine is mechanically connected to drive three direct current generators 43, 44 and 45. These generators 43, 44 and 45 are connected respectively to the winch motor 40, the mill driving motor 18, and the winch motor 35. A constant potential exciter 47 is also mechanically driven by the prime mover 42 and the output thereof is connected to the main field winding of each motor and the auxiliary field winding of each generator. The prime mover 42 turns at essentially constant speed.

A comparator or mixer 50 has a first input connected to a feedback path 51 from the output of the generator 44 and a second input connected to a timed reference voltage supply 52. The output of the timed reference voltage supply 52 can be adjusted to correspond to the desired mill speed by an adjustable resistor 53. This comparator 50 has a third input connected to a power supply (not shown) through a variable resistor 61. The variable resistor 61 may be used to introduce other functions, for example, an interia compensation signal, into the system. The output of the comparator or mixer 50 is connected to an amplifier 54, the output of which is applied to the main field winding 55 of generator 44, this main field winding being in opposition to the auxiliary field winding. The main field winding is the control winding for the generator output. The purpose of the auxiliary winding is to counteract the inherent residual mangetism present in the generator so that the generator output will be zero with a corresponding zero input applied to the main field winding. An overload circuit breaker 56 is connected between the generator 44 and the motor 18.

The feedback path 51 from the output of the generator 44 and the output of the timed reference voltage supply 52 are also applied to the inputs of a comparator 60. The output of the comparator 60 is fed to a first input of each of a pair of comparators 63 and 64. The comparator 63 also has an input connected through a feedback path 65 to the output of the generator 45 and a third input connected to a power supply (not shown) through an adjustable resistor 66. The output of the comparator 63 is fed to an amplifier 67, the output of which is applied to the main field winding 68 of the generator 45, which is arranged to opposite the auxiliary field winding, as in the generator 44. An overload circuit breaker 69 is provided in the circuit between the generator 45 and the motor 35.

In a similar manner, the comparator 64 has a second input connected to a power supply (not shown) through a variable resistor 73. The output of the comparator 64 is amplified by an amplifier 74 and applied to the main field winding 75 of the generator 43, which is also arranged in opposition to the auxiliary field winding of the generator. An overload circuit breaker 76 is provided in the circuit between the generator 43 and the motor 40.

When the system is activated, the generators 43, 44 and 45 will each produce an output current to energize motors 40, 18 and 35 respectively. The motors 40 and 35 produce sufficient torque to maintain the desired tension on the cables connecting the barge with the tug boats. Assuming that the pipe mill is operating at the same rate of speed as the barge is moving through the water, the system will be in equilibrium and the output of the comparator 60 will be effectively zero. If the pipe mill should begin to operate more slowly than the rate of movement of the barge through the water, the load on the mill-driving motor 18 will decrease, as will the motor current. The comparator 60 senses the resulting unbalance between the feedback signal and the reference signal and produces an output of negative polarity. This signal is applied to the inputs of each of the comparators or mixers 63 and 64, causing each of these comparators to produce an unbalance or error signal. The error signal from the comparator 63 is amplified by the amplifier 67 and applied across the main field winding 68. The negative signal will cause a decrease in output of amplifier 67, which in turn will cause the generator 45 output to decrease, thus decreasing the cable holding ability of drive motor 35 and allowing the cable to pay out from reel 34. The generator 45 output will be controlled such that it will maintain a desired tension on the cable by motor 35. The magnitude of cable tension will be a function of the reference signal and the feedback signal.

The comparator 63 thus compares the reference signals and feedback signal and supplies a resultant signal to the amplifier 67 for controlling the output of generator 45. The reference signal for comparator 63 is the combination of the error signal from comparator 60 and the desired cable tension resulting from the signal developed by the adjustable resistance 67. These reference signals tend to drive the comparator output full on. The signal on the feedback path 65 increases with the generator 45 output and tends to drive the comparator output towards zero.

This same negative signal from comparator 60 will apply an error signal to comparator 64. The comparator 64 output is amplified by the amplifier 74 and applied to the main field winding 75 which causes an increase in the output of generator 43. The increased output of generator 43 drives the motor 40 to recoil cable on reel 39. As in the case of the comparator 63, the reference signal is the combination of the signal from comparator 60 and the signal developed by the resistance 73 and the feedback signal is that present on path 72. The magnitude of cable tension will be a function of the reference signal and the feedback signal.

The increase in current in motor 40 and corresponding decrease in current in motor 35 results in the motor 40 exerting a greater torque so that the barge moves toward the rear tugboat. The opposite action, of course, takes place when the load on motor 18 is increased. In that case, the output of the generator 45 is increased and the output of generator 43 decreased, so that the barge moves toward the forward tug.

In order to provide smooth, timed acceleration when the system is first actuated, the reference voltage supply 52 is of the type that advances to its preset value over a preselected time interval. The output of voltage supply 52 is fed to the comparator 50, as is a feedback signal from the output of generator 44. In starting the mill, the output signal from 52 increases from zero to the desired mill speed signal as set by the adjustable resistor 53 linearly over a preselected time interval. From the resultant of the speed reference signal from 52 and the feedback signal on path 51, the comparator 50 supplies an input signal to amplifier 54 which is amplified and applied to the main field winding 55. Thus the output of generator 44 is allowed to rise linearly to provide the mill motor 18 with a smooth acceleration up to the desired operating mill speed.

The electrical equipment is preferably housed in a cabinet 52, adjacent the control panel 53.

The laying of pipe in an offshore location is accomplished in the following manner: enough cable is reeled out from a winch 34 between the forward tugboat 30 and the barge 10 to permit safe operation in the sea, as well as to permit the running of a full coil 18 of skelp. A similar amount of cable is reeled out from the winch 39 in relation to the rear tugboat 31. The forward tugboat 30 then sets its engines so as to run a few feet per minute more than the welding speed of the pipe mill, or a few feet per minute faster than such welding speed. The rear tugboat 31 sets its engine so as to run at a slightly slower speed than that of the forward tugboat 30, in order that the cables 32 and 36 be kept under tension and thus cut down the drift of the barge 10. The two tugboats and the barge then move forward in unison at either a slower speed or a faster speed than the welding speed of the pipe mill, as the operator pushes the "start" button for the pipe mill. The winch drive motors 34 and 40 are activated at the same time, and the barge is thereafter propelled through the water as a function of the welding speed of the pipe mill. This mode of operation allows the motion of the barge 10 to be semi-independent and having some speed differential with respect to the speed of the tugboats 30 and 31. The control of the direct current winch motors is regulated from the welding speed as a function of the current in the drive motor 15 for the pipe mill, the driveout motor current reflecting the loading within the pipe mill. With the automatic current regulation system in operation, if the pipe mill begins to operate more slowly than the rate of movement of the barge 10 through the water, the load on the mill-driving motor decreases, with consequent decrease in motor current. Conversely, if the pipe mill tends to operate at too great a speed, the load increases on the mill-driving motor 15 with consequent increase in its current. The electrical system shown in FIGURE 2 continuously monitors this current and makes the necessary corrective changes to the barge motion by the use of the two winch drives. In the case of speed regulation, the electrical system continuously monitors the pipe-mill speed and makes the appropriate correction. The relative distances between the barge 10 and the two tugboats 30 and 31 is thus governed by the electrical control system.

While a thousand-foot coil of skelp is being formed and welded into continuous pipe 24, the two tugboats 30 and 31 may travel a distance of 900 feet, and the barge 10 may travel relatively toward the forward tug 30 for a distance of 100 feet, making one thousand feet over all. On the other hand, and two tugboats may travel eleven hundred feet and the barge may travel toward the rearward tug 31 a distance of one hundred feet, making the total travel of the barge 10 equal to one thousand feet.

Summarizing, the direct-current motors 35 and 40 of the two winches 34 and 39 are connected and regulated electrically with respect to the direct-current motor 15, which drives the forming and sizing sections of the pipe mill 11. The winches either increase or decrease the speed of the barge 10, relative to the tugboats, so as to make the pipe 24 emerge in a stationary position with respect to the water. In this way, the pipe-mill speed and the barge traveling speed are synchronized.

The apparatus as above-described may be employed in swamp areas, as well as in marine locations. When operating in a swamp area, the tugboats 30 and 31 may be replaced by swamp buggies, or a single swamp buggy may be employed ahead of the barge 10 and used to move a portable anchor to a forward location each time a new coil of skelp is placed in position. In the latter case, the winch cable 32 is passed through a pulley on such portable anchor, not shown. The winch 34 is then synchronized exactly to the speed of the motor 15, driving the pipe mill 11, and in this way the barge 10 is moved forward at the same speed the pipe 24 is being made.

Having fully described my invention, it is to be understood that I am not to be limited to the details herein set forth, but that my invention is of the full scope of the appended claims.

What is claimed is:

1. Floating apparatus for making continuous pipe, comprising in combination: a floating barge, means including transition rolls on the barge for shaping a moving metal strip into a cylindrical member, said means including at least one motor for driving said transition rolls and moving the metal strip therethrough, a welding device mounted on the barge for joining edges of the shaped strip to form a continuous pipe, a first tugboat forward of the barge and a second tugboat rearward of the barge, a pair of winches on the barge each having a cable to be wound-in and payed-out by its respective winch, one of the cables extending forward from said barge and the other extending rearward therefrom, means on each tugboat for engaging one of said cables, respectively, a pair of motors, one connected to drive each winch, respectively, and means connected to each of said motors to synchronize the relative speeds of the winch motors and the roll driving motor.

2. Floating apparatus for making continuous pipe, comprising in combination: a floating barge means including transition rolls on the barge for shaping a moving metal strip into a cylindrical member, said means including at least one motor for driving said transition rolls, and moving the metal strip therethrough, a welding device mounted on the floating barge for joining edges of the shaped strip to form a continuous pipe, a first tugboat forward of the barge and a second tugboat rearward of the barge, a pair of winches on the barge each having a cable to be wound-in and payed-out by its respective winch, one of the cables extending forward from said barge and the other extending rearward therefrom, a pulley on each tugboat engaging one of said cables, respectively, the end of each cable extending back to the barge, a pair of motors, one connected to drive each winch, respectively, and means connected to each of said motors to synchronize the relative speeds of the winch motors and the roll driving motor.

References Cited by the Examiner

UNITED STATES PATENTS

| 2,755,632 | 7/1956 | Hauber et al. | 61—72.4 |
| 3,075,484 | 1/1963 | Benteler | 113—33 |
| 3,120,107 | 2/1964 | Juusella et al. | 61—72.6 |
| 3,139,991 | 7/1964 | Homes | 214—1 |

OTHER REFERENCES

Construction Methods Magazine, February 1932, page 38.

MILTON BUCHLER, *Primary Examiner.*

FERGUS S. MIDDLETON, *Examiner.*

T. M. BLIX, *Assistant Examiner.*